United States Patent [19]

Manzouji et al.

[11] Patent Number: 5,633,335
[45] Date of Patent: May 27, 1997

[54] COPOLYMER OF SILICONE MACROMONOMER AND ALICYCLIC EPOXY MONOMER

[75] Inventors: Ryuko Manzouji; Tadashi Okawa, both of Chiba Prefecture, Japan

[73] Assignee: Dow Corning Toray Silicone Co., Ltd., Tokyo, Japan

[21] Appl. No.: 607,907

[22] Filed: Feb. 28, 1996

[51] Int. Cl.⁶ .................. C08F 220/32; C08F 230/08
[52] U.S. Cl. .................. 526/273; 526/279; 525/326.5
[58] Field of Search .................. 525/286, 326.5; 526/273, 279

[56] References Cited

U.S. PATENT DOCUMENTS

| | | | |
|---|---|---|---|
| 4,972,027 | 11/1990 | Isozaki et al. | 525/286 |
| 5,051,473 | 9/1991 | Tabuchi et al. | 526/279 |
| 5,130,167 | 7/1992 | Mitsuji et al. | 427/407.1 |
| 5,166,265 | 11/1992 | Nakahata et al. | 525/199 |
| 5,250,615 | 10/1993 | Yamamoto et al. | 525/63 |
| 5,338,799 | 8/1994 | Ohsugi et al. | 526/279 |
| 5,536,782 | 7/1996 | Takarada et al. | 526/279 |

OTHER PUBLICATIONS

The Preparation and Applications of Epoxy Resins, Kobunshi Kagaku Kanko–Kai Kabushiki Kaisha, 1963, pp. 113–115.

*Primary Examiner*—Robert E. Sellers
*Attorney, Agent, or Firm*—Alexander Weitz

[57] ABSTRACT

There is disclosed a novel silicone-grafted, alicyclic epoxy-functional vinyl polymer prepared by copolymerizing (A) 1 to 80 weight % of a silicone macromonomer which bears a vinyl-polymerizable group at one molecular chain terminal;

(B) 5 to 90 weight % of a vinyl-polymerizable, alicyclic epoxy-functional monomer; and (C) 0.01 to 94 weight % of a vinyl-polymerizable non-silicone monomer that is free of alicyclic epoxy functionality.

The alicyclic epoxy functionality imparts improved reactivity and the grafted polymer according to the invention provides cured films which exhibit good release and water-repellency.

10 Claims, No Drawings

COPOLYMER OF SILICONE MACROMONOMER AND ALICYCLIC EPOXY MONOMER

FIELD OF THE INVENTION

This invention relates to novel silicone-grafted, epoxy-functional vinyl polymers and to a method for their preparation. More particularly, this invention relates to novel silicone-grafted, alicyclic epoxy-functional vinyl polymers (hereinafter abbreviated as SG/AEF vinyl polymers) that are capable of forming release films and to a method for the preparation of said SG/AEF vinyl polymers.

BACKGROUND OF THE INVENTION

Film-forming epoxy-functional vinyl polymers in the form of styrene-glycidyl methacrylate copolymers (styrene:glycidyl methacrylate weight ratio=85:15) are known in the art. These copolymers form hard, insoluble films when mixed with methyl isobutyl ketone, then combined with phosphoric acid at the rate of 0.85 mol phosphoric acid per 1 mol epoxy group, and heated for 30 minutes at 150° C. These films are reported to exhibit a hardness and weatherability superior to those of alkyd nitrocellulose films (*The Preparation and Applications of Epoxy Resins*, published by Kobunshi Kagaku Kanko-kai Kabushiki Kaisha, 1963, pp. 113–115).

Silicone-type epoxy-functional vinyl polymers are also known in the form of copolymers obtained by the graft polymerization of glycidyl methacrylate and acrylate ester with the cocondensate of gamma-methacryloxypropylmethyldimethoxysilane and cyclic dimethylsiloxane, as disclosed in Japanese Patent Application Laid Open Number Hei 2-138360.

However, since the epoxy group in these prior-art epoxy-functional vinyl polymers is the glycidoxy group, they suffer from the particular problem of a low ring-opening and crosslinking reactivity under the action of electrophilic reagents such as, for example, acids. Moreover, it is difficult to obtain highly releasing and highly water-repellent films from these epoxy-functional vinyl polymers even when they can be cured. Thus, demand exists for a silicone-grafted vinyl polymer that would contain the highly reactive alicyclic epoxy group.

SUMMARY OF THE INVENTION

The present invention takes as an object the introduction of novel silicone-grafted, alicyclic epoxy-functional vinyl polymers which overcome the above mentioned problems. An additional object of the present invention is the introduction of a method for the preparation of said SG/AEF vinyl polymers.

The present invention therefore, relates to silicone-grafted, alicyclic epoxy-functional vinyl polymers afforded by the copolymerization of (A) a vinyl-polymerizable silicone macromonomer, (B) a vinyl-polymerizable, alicyclic epoxy-functional monomer, and (C) a vinyl-polymerizable nonsilicone monomer that is free of alicyclic epoxy functionality, with the proviso that the copolymerization proportion of component (A):component (B):component (C)=1 to 80 weight %:5 to 90 weight %:0.01 to 94 weight %.

The invention also relates to a method for the preparation of said silicone-grafted, alicyclic epoxy-functional vinyl polymers, wherein said method is characterized by the copolymerization of components (A) through (C) in the presence of a radical polymerization initiator. The present invention has been disclosed in Japanese Patent Application Number Hei 07-065150, the full disclosure of which is hereby incorporated by reference.

DETAILED DESCRIPTION OF THE INVENTION

The vinyl-polymerizable silicone macromonomer (A) of the present invention is an organopolysiloxane, preferably polydimethylsiloxane, that bears a vinyl-polymerizable group only at one molecular chain terminal, wherein said vinyl-polymerizable group is exemplified by acryloxy, methacryloxy, acrylamide, methacrylamide, styryl, and vinyl, inter alia. This organopolysiloxane preferably has a number-average molecular weight of 500 to 50,000 and more preferably 1,000 to 20,000. Its silicon-bonded groups, other than the vinyl-polymerizable group, are exemplified by alkyl groups such as methyl, ethyl, and propyl and aryl groups such as phenyl. When this component also contains organopolysiloxane that is vinyl-polymerizable at both terminals, problems will occur during copolymerization such as gelation and/or a substantial increase in the viscosity. On the other hand, when this component contains organopolysiloxane that is nonfunctional at both terminals, there is a risk of bleed-out from the ultimately obtained film. These considerations make it highly desirable for the vinyl-polymerizable silicone macromonomer (A) to have a high purity. The vinyl-polymerizable silicone macromonomer (A) can be prepared, for example, by the nonequilibration ring-opening polymerization of cyclic trisiloxane followed by addition of vinyl-polymerizable group-functional dimethylchlorosilane. A high-purity vinyl-polymerizable silicone macromonomer can be recovered from this nonequilibration ring-opening polymerization by running said polymerization in the presence of a nitrile or ester compound and a polar solvent such as tetrahydrofuran or dimethylformamide (refer to Japanese Patent Application Number Hei 6-113951).

The vinyl-polymerizable, alicyclic epoxy-functional monomer (B) of the present invention is a compound that contains at least one alicyclic epoxy group and at least one vinyl-polymerizable group, wherein said alicyclic epoxy group is exemplified by 3,4-epoxycyclohexyl and 4-methyl-3,4-epoxycyclohexyl and said vinyl-polymerizable group is exemplified by acryloxy, methacryloxy, acrylamide, methacrylamide, styryl, and vinyl. While the chemical structure of this component is not critical, disiloxanes with the following general formula are preferred for their ease of synthesis

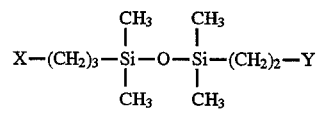

In the above formula, X is a vinyl-polymerizable group, exemplified as above, and Y is an alicyclic epoxy group, again exemplified as above. This disiloxane can be synthesized, for example, by an addition reaction between an aliphatically unsaturated alicyclic epoxy compound and an organopolysiloxane bearing a vinyl-polymerizable group at one terminal and silicon-bonded hydrogen at the other terminal (for such an organopolysiloxane, refer to Japanese Patent Application Laid Open Number Hei 2-92933).

Component (C) of the present invention, (i.e., vinyl-polymerizable non-silicone monomer that is free of alicyclic epoxy functionality), is exemplified by the various esters of acrylic acid and methacrylic acid, styrene and its derivatives, acrylic acid, methacrylic acid, vinyl acetate, vinylidene chloride, and polyalkylene glycol monomethacrylates, inter alia. These may be used individually or as a combination of two or more monomers. In order to improve the releasability exhibited by the ultimately obtained film, compounds that reduce the glass-transition point of the vinyl polymer according to the present invention, such as the acrylate esters, are preferred from among the preceding examples. Particularly preferred for this purpose are the higher esters of acrylic acid, such as butyl acrylate and the like.

The SG/AEF vinyl polymer according to the present invention is prepared by the copolymerization of the above-described components (A), (B), and (C). The copolymerization proportions for these components are component (A):component (B):component (C)=1 to 80 weight %:5 to 90 weight %:0.01 to 94 weight %, the total of (A), (B) and (C), of course, being 100 weight %. Preferably component (A):component (B):component (C)=3 to 70 weight %:10 to 80 weight %:0.01 to 87 weight %. With regard to the component (A) proportion, the ultimately obtained film suffers from a reduced releasability at a component (A) proportion below 1 weight % and suffers from a reduced mechanical strength at above 80 weight %. With regard to the component (B) proportion, a component (B) proportion below 5 weight % results in a diminished curability when curing catalyst is added, while a proportion in excess of 90 weight % causes a reduced releasability by the ultimately obtained film.

Well-known copolymerization methods can be used to prepare the SG/AEF vinyl polymer, such as radical polymerization, anionic polymerization, group-transfer polymerization, and so forth. Radical polymerization is preferred for its ease of execution. Usable radical polymerization initiators are exemplified by azo compounds such as azobisisobutyronitrile and by peroxides such as benzoyl peroxide and dicumyl peroxide. The polymerization technique is exemplified by solution, emulsion, suspension, and bulk polymerization techniques. The preferred technique is solution polymerization, in which components (A) to (C) can be dissolved to homogeneity and polymerized in a homogeneous system. The solvent used in this case will vary depending on the nature and copolymerization proportion of component (C), but can be generally exemplified by aromatic hydrocarbons such as benzene, toluene, xylene, and the like; ketones such as methyl ethyl ketone, methyl isobutyl ketone, and the like; esters such as ethyl acetate, butyl acetate, and the like; and ethers such as tetrahydrofuran, dioxane, diethyl ether, and the like. These solvents can be used individually or as combinations of 2 or more selections.

The SG/AEF vinyl polymers according to the present invention as described above are novel organic solvent-soluble compounds. A characteristic feature of these compounds, which is due to the presence of the highly reactive alicyclic epoxy group, is their ability to readily undergo ring-opening and crosslinking. The vinyl polymers according to the present invention form water-repellent release films when coated on such substrates as; for example, plastic films and paper. The subject vinyl polymers are preferably coated on substrates at coating weights of 0.1 to 10 g/m² using devices such as bar coaters. The vinyl polymers according to the present invention are frequently solid or semi-solid at ambient temperatures, and are therefore preferably used dissolved in the required amount of organic solvent.

The SG/AEF vinyl polymers according to the present invention produce substrate-adhesive cured release films through the ring-opening and crosslinking—induced by whatever means—of the alicyclic epoxy groups in the molecule. One means for ring-opening and crosslinking of the alicyclic epoxy group consists, for example, of the addition of a conventional curing agent for epoxy resins, such as organic amines, carboxylic anhydrides, polyamide resins, and phenolic resins. Besides these, high crosslinking-rate curing catalysts can be added in the form of various acids and onium salt photocuring catalysts. The onium salt photocuring catalysts are preferred here, and these are exemplified by the diazonium salts $ArN_2^{+Z-}$, in which Ar is an aryl group and Z is a nonbasic, non-nucleophilic anion such as $BF_4$, $PF_6$, $ASP_6$, $SbF_6$, $SbCl_6$, $HSO_4$, $ClO_4$, and the like; sulfonium salts $R_3S^+Z^-$, in which R is alkyl or aryl and Z is defined as above; and iodonium salts $R_2I^{3\oplus} Z^-$, in which R and Z are defined as above. Onium salt photocuring catalysts are preferably added at 0.1 to 20 weight parts per 100 weight parts vinyl polymer according to the present invention and more preferably at 1 to 10 weight parts per 100 weight parts vinyl polymer according to the present invention. A low photocurability occurs at an addition below 0.1 weight part, while additions in excess of 20 weight parts can lead to a reduced releasability by the ultimately obtained film. In the case of mixtures of vinyl polymer according to the present invention and onium salt photocuring catalyst, it is preferred that these mixtures be used dissolved in the necessary amount of organic solvent and that after coating on the substrate the organic solvent be removed, for example, by evaporation. After the coating operation, curing can be effected by evaporative elimination of the solvent followed by exposure to ultraviolet radiation. Light sources such as high-pressure mercury lamps and metal halide lamps are typically used as the ultraviolet light source.

EXAMPLES

This invention will be explained in greater detail through the working examples that follow. In the examples, "parts" denotes "weight parts" and "Me" denotes the methyl group. The values for the number-average molecular weight of the vinyl polymer products were obtained by gel permeation chromatography (GPC) calibrated with polystyrene standards.

EXAMPLE 1

Toluene (150 parts) was placed in a 100-mL flask equipped with a stirrer, thermometer, condenser, and nitrogen inlet tube and nitrogen was bubbled through for 30 minutes in order to eliminate dissolved oxygen. Into this flask were then introduced 75 parts of methyl methacrylate, 5 parts of 1-(3',4'-epoxycyclohexyl)ethyl-3-methacryloxypropyltetramethyldisiloxane, 20 parts of silicone macromonomer with the average formula

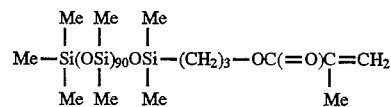

and 2 parts of azobisisobutyronitrile. This was followed by another 30-minute period of nitrogen bubble-through. The mixture was then stirred under nitrogen for 24 hours while heating to 60° C. to yield a toluene solution of SG/AEF polymethyl methacrylate. In order to purify the SG/AEF polymethyl methacrylate by reprecipitation, this toluene solution was poured into n-hexane and methanol was then added. Analysis of the resulting SG/AEF polymethyl methacrylate by GPC confirmed the almost complete disappearance of the starting material peaks. This SG/AEF polymethyl methacrylate had a number-average molecular weight of 57,563.

EXAMPLE 2

Toluene (150 parts) was placed in a 100-mL flask equipped with a stirrer, thermometer, condenser, and nitrogen inlet tube and nitrogen was bubbled through for 30 minutes in order to eliminate dissolved oxygen. Into this flask were then introduced 24 parts of methyl acrylate, 46 parts of 1-(3',4'-epoxycyclohexyl)ethyl-3-methacryloxypropyltetramethyldisiloxane, 30 parts of silicone macromonomer with the average formula

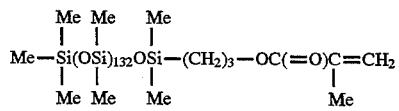

and 2 parts of azobisisobutyronitrile. This was followed by another 30-minute period of nitrogen bubble-through. The mixture was then stirred under nitrogen for 24 hours while heating to 60° C. to yield a toluene solution of SG/AEF polymethyl acrylate. Analysis of this toluene solution by GPC confirmed the almost complete disappearance of the starting material peaks. Elimination of the toluene and unreacted methyl acrylate from this toluene solution by heating at reduced pressure yielded a semi-solid SG/AEF polymethyl acrylate. This SG/AEF polymethyl acrylate had a number-average molecular weight of 119,849.

EXAMPLE 3

Toluene (150 parts) was placed in a 100-mL flask equipped with a stirrer, thermometer, condenser, and nitrogen inlet tube and nitrogen was bubbled through for 30 minutes in order to eliminate dissolved oxygen. Into this flask were then introduced 30 parts of butyl acrylate, 40 parts of 1-(3',4'-epoxycyclohexyl)ethyl-3-methacryloxypropyltetramethyldi siloxane, 30 parts of silicone macromonomer with the average formula

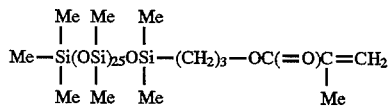

and 2 parts of azobisisobutyronitrile. This was followed by another 30-minute period of nitrogen bubble-through. The mixture was then stirred under nitrogen for 24 hours while heating to 60° C. to yield a toluene solution of SG/AEF polybutyl acrylate. Analysis of this toluene solution by GPC confirmed the almost complete disappearance of the starting material peaks. Elimination of the toluene and unreacted butyl acrylate from this toluene solution by heating at reduced pressure yielded a semi-solid SG/AEF polybutyl acrylate. This SG/AEF polybutyl acrylate had a number-average molecular weight of 46,340.

EXAMPLE 4

Toluene (150 parts) was placed in a 100-mL flask equipped with a stirrer, thermometer, condenser, and nitrogen inlet tube and nitrogen was bubbled through for 30 minutes in order to eliminate dissolved oxygen. Into this flask were then introduced 30 parts of butyl acrylate, 40 parts of 1-(3',4'-epoxycyclohexyl)ethyl-3-methacryloxypropyltetramethyldi siloxane, 30 parts of silicone macromonomer with the average formula

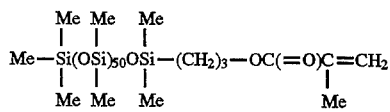

and 2 parts of azobisisobutyronitrile. This was followed by another 30-minute period of nitrogen bubble-through. The mixture was then stirred under nitrogen for 24 hours while heating to 60° C. to yield a toluene solution of SG/AEF polybutyl acrylate. Analysis of this toluene solution by GPC confirmed the almost complete disappearance of the starting material peaks. Elimination of the toluene and unreacted butyl acrylate from this toluene solution by heating at reduced pressure yielded a semi-solid SG/AEF polybutyl acrylate. This SG/AEF polybutyl acrylate had a number-average molecular weight of 89,906.

EXAMPLE 5

Toluene (150 parts) was placed in a 100-mL flask equipped with a stirrer, thermometer, condenser, and nitrogen inlet tube and nitrogen was bubbled through for 30 minutes in order to eliminate dissolved oxygen. Into this flask were then introduced 30 parts of butyl acrylate, 40 parts of 1-(3',4'-epoxycyclohexyl)ethyl-3-methacryloxypropyltetramethyldi siloxane, 30 parts of silicone macromonomer with the average formula

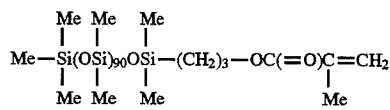

and 2 parts of azobisisobutyronitrile. This was followed by another 30-minute period of nitrogen bubble-through. The mixture was then stirred under nitrogen for 24 hours while heating to 60° C. to yield a toluene solution of SG/AEF polybutyl acrylate. Analysis of this toluene solution by GPC confirmed the almost complete disappearance of the starting material peaks. Elimination of the toluene and unreacted butyl acrylate from this toluene solution by heating at reduced pressure yielded a semi-solid SG/AEF polybutyl acrylate. This SG/AEF polybutyl acrylate had a number-average molecular weight of 77,216.

EXAMPLE 6

Toluene (150 parts) was placed in a 100-mL flask equipped with a stirrer, thermometer, condenser, and nitrogen inlet tube and nitrogen was bubbled through for 30 minutes in order to eliminate dissolved oxygen. Into this flask were then introduced 40-parts of butyl acrylate, 50 parts of 1-(3',4'-epoxycyclohexyl)ethyl-3-methacryloxypropyltetramethyldi siloxane, 10 parts of silicone macromonomer with the average formula

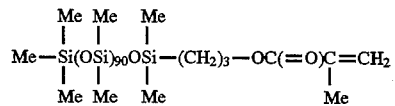

and 2 parts of azobisisobutyronitrile. This was followed by another 30-minute period of nitrogen bubble-through. The mixture was then stirred under nitrogen for 24 hours while heating to 60° C. to yield a toluene solution of SG/AEF polybutyl acrylate. Analysis of this toluene solution by GPC confirmed the almost complete disappearance of the starting material peaks. Elimination of the toluene and unreacted butyl acrylate from this toluene solution by heating at reduced pressure yielded a semi-solid SG/AEF polybutyl acrylate. This SG/AEF polybutyl acrylate had a number-average molecular weight of 106,833.

EXAMPLE 7

Toluene (150 parts) was placed in a 100-mL flask equipped with a stirrer, thermometer, condenser, and nitrogen inlet tube and nitrogen was bubbled through for 30 minutes in order to eliminate dissolved oxygen. Into this flask were then introduced 35 parts of butyl acrylate, 45 parts of 1-(3',4'-epoxycyclohexyl)ethyl-3-methacryloxypropyltetramethyldi siloxane, 20 parts of silicone macromonomer with the average formula

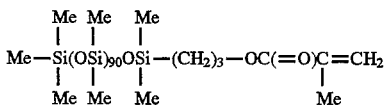

and 2 parts of azobisisobutyronitrile. This was followed by another 30-minute period of nitrogen bubble-through. The mixture was then stirred under nitrogen for 24 hours while heating to 60° C. to yield a toluene solution of SG/AEF polybutyl acrylate. Analysis of this toluene solution by GPC confirmed the almost complete disappearance of the starting material peaks. Elimination of the toluene and unreacted butyl acrylate from this toluene solution by heating at reduced pressure yielded a semi-solid SG/AEF polybutyl acrylate. This SG/AEF polybutyl acrylate had a number-average molecular weight of 81,694.

EXAMPLE 8

Toluene (150 parts) was placed in a 100-mL flask equipped with a stirrer, thermometer, condenser, and nitrogen inlet tube and nitrogen was bubbled through for 30 minutes in order to eliminate dissolved oxygen. Into this flask were then introduced 35 parts of methyl methacrylate, 35 parts of 1-(3',4'-epoxycyclohexyl)ethyl-3-methacryloxypropyltetramethyldi siloxane, 30 of parts silicone macromonomer with the average formula

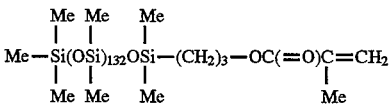

and 2 parts of azobisisobutyronitrile. This was followed by another 30-minute period of nitrogen bubble-through. The mixture was then stirred under nitrogen for 24 hours while heating to 60° C. to yield a toluene solution of SG/AEF polymethyl methacrylate. In order to purify the SG/AEF polymethyl methacrylate by reprecipitation, this toluene solution was poured into n-hexane and methanol was then added. Analysis of the resulting SG/AEF polymethyl methacrylate by GPC confirmed the almost complete disappearance of the starting material peaks. This SG/AEF polymethyl methacrylate had a number-average molecular weight of 26,399.

COMPARATIVE EXAMPLE 1

Toluene (150 parts) was placed in a 100-mL flask equipped with a stirrer, thermometer, condenser, and nitrogen inlet tube and nitrogen was bubbled through for 30 minutes in order to eliminate dissolved oxygen. Into this flask were then introduced 47 parts of butyl acrylate, 23 parts of glycidyl methacrylate, 30 parts of silicone macromonomer with the average formula

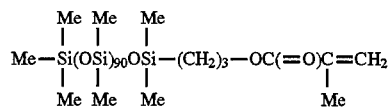

2 parts of azobisisobutyronitrile. This was followed by another 30-minute period of nitrogen bubble-through. The mixture was then stirred under nitrogen for 24 hours while heating to 60° C. to yield a toluene solution of silicone-grafted epoxy-functional polybutyl acrylate. Analysis of this toluene solution by GPC confirmed the almost complete disappearance of the starting material peaks. Elimination of the toluene and unreacted butyl acrylate from this toluene solution by heating at reduced pressure yielded silicone-grafted epoxy-functional polybutyl acrylate. This silicone-grafted epoxy-functional polybutyl acrylate had a number-average molecular weight of 107,086.

APPLICATION EXAMPLE 1

One hundred parts of the SG/AEF vinyl polymer synthesized in Example 1 was dissolved in n-hexane to give a solids concentration of 7 weight %. This solution was coated using a bar coater on the surface of polyethylene terephthalate film to give a solids coating weight of 0.1 g/m². The release resistance, residual adhesiveness, and writability of the coated surface were measured by the methods described below, and these results are reported in Table 1.

Release Resistance

A commercial pressure-sensitive adhesive tape (width=38 mm, brand name: 31B, product of Nitto Denko Kabushiki Kaisha) was pressed onto the vinyl polymer-coated surface using one back-and-forth excursion with a 2-kg tape roller. This assembly was then held for 20 hours at 70° C. with a load of 20 g/cm² on the pressure-sensitive adhesive tape. After this holding period, the sample was cooled for 2 hours at ambient conditions. Using a Tensilon testing machine the pressure-sensitive adhesive tape was then peeled at 180° at a rate of 300 mm/minute and the force required for separation was measured (g/38 mm).

Residual Adhesiveness

The separated pressure-sensitive tape afforded by measurement of the release resistance was folded in two in order to evaluate the degree of adhesion between the two halves. A score of "+ +" was assigned when this adhesion was unchanged from its original level; a score of "+" was assigned when this adhesion was somewhat lower than the original level; and a score of "x" was assigned when there was almost no residual adhesion.

Paintability

Characters were written on the vinyl polymer-coated surface using a commercial oil-based ink pen. A score of "+ +" was assigned when absolutely no crawling occurred and the characters could be clearly written; a score of "+" was assigned when crawling occurred but the characters could still be written; and a score of "x" was assigned when the characters could not be written due to almost complete crawling.

APPLICATION EXAMPLE 2

Two parts of an onium salt curing catalyst (GE9130C from the General Electric Company) were added, respectively, to 100 parts of each of the SG/AEF vinyl polymers synthesized in Examples 2 to 4. The resulting mixtures were dissolved in n-hexane to give a solids concentration of 7 weight %. Each solution was coated on the polyethylene surface of polyethylene-laminated paper using a bar coater to give a solids coating weight of 0.5 g/m$^2$. Curing was then effected by exposing the coated surface using an ultraviolet exposure device that contained a high-pressure mercury lamp (130 mJ/cm$^2$). The release resistance, residual adhesiveness, and paintability of the polyethylene surface of the resulting polyethylene-laminated paper were measured by the methods described for Application Example 1, and these results are reported in Table 1.

For comparison, the polyethylene surface of polyethylene-laminated paper was treated as above, but using the silicone-grafted epoxy-functional vinyl polymer synthesized in Comparative Example 1 in place of the SG/AEF vinyl polymers synthesized in Examples 2 to 4. This treatment was followed by exposure to UV radiation, as described above. The treated surface became blurred when strongly rubbed with a finger, which confirmed that a coating had not been formed.

TABLE 1

|  | Application Example 1 | Application Example 2 | | |
|---|---|---|---|---|
|  |  | Example 2 | Example 3 | Example 4 |
| release resistance (g/38 mm) | 950 | 10 | 485 | 100 |
| residual adhesiveness | ++ | + | ++ | ++ |
| paintability | + | + | + | + |

That which is claimed is:

1. A silicone-grafted, alicyclic epoxy-functional vinyl polymer prepared by copolymerizing
   (A) 1 to 80 weight % of a silicone macromonomer which bears a vinyl-polymerizable group at one molecular chain terminal;
   (B) 5 to 90 weight % of a vinyl-polymerizable, alicyclic epoxy-functional monomer of the formula

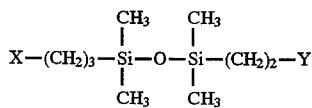

wherein X is a vinyl-polymerizable group and Y is an alicyclic epoxy group; and
   (C) 0.01 to 94 weight % of a vinyl-polymerizable non-silicone monomer that is free of alicyclic epoxy functionality, the total weight percent of components (A), (B) and (C) being 100.

2. The silicone-grafted, alicyclic epoxy-functional vinyl polymer according to claim 1, wherein Y is selected from the group consisting of 3,4-epoxycyclohexyl and 4-methyl-3,4-epoxycyclohexyl and X is selected from the group consisting of acryloxy, methacryloxy, acrylamide, methacrylamide, styryl and vinyl.

3. The silicone-grafted, alicyclic epoxy-functional vinyl polymer according to claim 2, wherein said silicone macromonomer (A) is a polydimethylsiloxane in which the vinyl-polymerizable group is selected from the group consisting of acryloxy and methacryloxy.

4. The silicone-grafted, alicyclic epoxy-functional vinyl polymer according to claim 2, wherein said silicone macromonomer (A) has a number-average molecular weight of 1,000 to 20,000.

5. The silicone-grafted, alicyclic epoxy-functional vinyl polymer according to claim 3, wherein said silicone macromonomer (A) has a number-average molecular weight of 1,000 to 20,000.

6. The silicone-grafted, alicyclic epoxy-functional vinyl polymer according to claim 1, wherein said vinyl-polymerizable non-silicone monomer that is free of alicyclic epoxy functionality (C) is at least one monomer selected from the group consisting of esters of acrylic acid, esters of methacrylic acid, styrene, acrylic acid, methacrylic acid, vinyl acetate, vinylidene chloride and polyalkylene glycol monomethacrylates.

7. The silicone-grafted, alicyclic epoxy-functional vinyl polymer according to claim 2, wherein said vinyl-polymerizable non-silicone monomer that is free of alicyclic epoxy functionality (C) is at least one monomer selected from the group consisting of esters of acrylic acid, esters of methacrylic acid, styrene, acrylic acid, methacrylic acid, vinyl acetate, vinylidene chloride and polyalkylene glycol monomethacrylates.

8. The silicone-grafted, alicyclic epoxy-functional vinyl polymer according to claim 1, wherein said silicone macromonomer (A) has a number-average molecular weight of 1,000 to 20,000.

9. The silicone-grafted, alicyclic epoxy-functional vinyl polymer according to claim 8, wherein said vinyl-polymerizable non-silicone monomer that is free of alicyclic epoxy functionality (C) is at least one monomer selected from the group consisting of esters of acrylic acid, esters of methacrylic acid, styrene, acrylic acid, methacrylic acid, vinyl acetate, vinylidene chloride and polyalkylene glycol monomethacrylates.

10. A method for the preparation of a silicone-grafted, alicyclic epoxy-functional vinyl polymer, said method comprising copolymerizing in the presence of a radical polymerization initiator
    (A) a silicone macromonomer which bears a vinyl-polymerizable group at one molecular chain terminal;
    (B) a vinyl-polymerizable, alicyclic epoxy-functional monomer of the formula

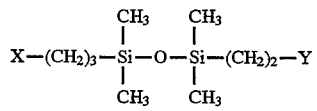

wherein X is a vinyl-polymerizable group and Y is an alicyclic epoxy group; and
    (C) a vinyl-polymerizable non-silicone monomer that is free of alicyclic epoxy functionality.

* * * * *